United States Patent
Cumming

(10) Patent No.: US 8,887,305 B2
(45) Date of Patent: Nov. 11, 2014

(54) METHODS AND DEVICES FOR PRESENTING EMAIL ADDRESSES

(75) Inventor: Joel Cumming, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 2 days.

(21) Appl. No.: 13/634,830

(22) PCT Filed: Jun. 22, 2012

(86) PCT No.: PCT/CA2012/050414
§ 371 (c)(1),
(2), (4) Date: Nov. 13, 2012

(87) PCT Pub. No.: WO2013/188946
PCT Pub. Date: Dec. 27, 2013

(65) Prior Publication Data
US 2013/0347128 A1    Dec. 26, 2013

(51) Int. Cl.
*G06F 7/04* (2006.01)
*H04L 9/32* (2006.01)
*H04L 29/06* (2006.01)
*G06F 21/31* (2013.01)
*H04L 12/58* (2006.01)

(52) U.S. Cl.
CPC ............... *G06F 21/31* (2013.01); *H04L 63/08* (2013.01); *H04L 51/28* (2013.01)
USPC ........................................... 726/28; 713/170

(58) Field of Classification Search
CPC ..... G06F 21/10; G06F 21/31; G06F 21/6218; G06F 21/604; G06F 2221/2141; H04L 63/102; H04L 63/20; H04L 63/0227; H04L 63/08; H04L 51/28

USPC ............. 726/1, 28, 20, 21, 22, 23, 25, 26, 29; 713/170

See application file for complete search history.

(56) References Cited

U.S. PATENT DOCUMENTS

| 713,730 | A * | 11/1902 | Willmarth ....................... 256/40 |
| 6,973,481 | B2 * | 12/2005 | MacIntosh et al. ........... 709/206 |
| 7,197,300 | B2 | 3/2007 | Kushita |
| 7,239,877 | B2 * | 7/2007 | Corneille et al. .......... 455/456.3 |
| 7,451,184 | B2 * | 11/2008 | Malik et al. ................... 709/206 |

(Continued)

FOREIGN PATENT DOCUMENTS

| CA | 2606155 | 4/2009 |
| WO | 01/52486 | 7/2001 |

OTHER PUBLICATIONS

Patent Cooperation Treaty, "Written Opinion", issued in connection with PCT application No. PCT/CA2012/050414, mailed Mar. 21, 2013, 3 pages.

(Continued)

*Primary Examiner* — Abu Sholeman
(74) *Attorney, Agent, or Firm* — Hanley, Flight & Zimmerman, LLC

(57) ABSTRACT

Methods and devices for data entry are disclosed. An example method includes executing an application on a mobile device, the application requiring a login to access at least a portion of data accessible via the application, accessing a store of email addresses associated with a user of the mobile device, the email addresses including at least a forwarding email address, and presenting the email addresses including the forwarding email address for selection as the login.

19 Claims, 4 Drawing Sheets

(56) References Cited

U.S. PATENT DOCUMENTS

| | | | | |
|---|---|---|---|---|
| 7,669,218 B1* | 2/2010 | Groff et al. | | 725/50 |
| 7,917,394 B2* | 3/2011 | Borelli et al. | | 705/26.1 |
| 8,121,610 B2* | 2/2012 | Dicke et al. | | 455/456.1 |
| 8,281,372 B1* | 10/2012 | Vidal | | 726/5 |
| 8,549,591 B2* | 10/2013 | Vidal | | 726/5 |
| 8,607,340 B2* | 12/2013 | Wright | | 726/22 |
| 2002/0138581 A1* | 9/2002 | MacIntosh et al. | | 709/206 |
| 2004/0158612 A1* | 8/2004 | Concannon | | 709/206 |
| 2004/0202117 A1* | 10/2004 | Wilson et al. | | 370/310 |
| 2005/0138618 A1* | 6/2005 | Gebhart | | 717/176 |
| 2005/0154648 A1* | 7/2005 | Strause | | 705/26 |
| 2006/0085531 A1* | 4/2006 | Lei et al. | | 709/223 |
| 2008/0144471 A1* | 6/2008 | Garapati et al. | | 369/99 |
| 2008/0256198 A1* | 10/2008 | Kamat | | 709/206 |
| 2009/0228564 A1* | 9/2009 | Hamburg | | 709/206 |
| 2010/0325194 A1* | 12/2010 | Williamson et al. | | 709/203 |
| 2011/0023115 A1* | 1/2011 | Wright | | 726/22 |
| 2011/0034158 A1* | 2/2011 | Bradley et al. | | 455/418 |
| 2011/0112847 A1* | 5/2011 | Ball et al. | | 705/1.1 |
| 2012/0124676 A1* | 5/2012 | Griffin et al. | | 726/28 |
| 2012/0233462 A1* | 9/2012 | Wang et al. | | 713/168 |
| 2012/0240243 A1* | 9/2012 | Allardyce | | 726/28 |
| 2012/0246642 A1* | 9/2012 | Pafumi et al. | | 718/1 |
| 2012/0271899 A1* | 10/2012 | Hamburg | | 709/206 |
| 2012/0324547 A1* | 12/2012 | Vidal | | 726/4 |
| 2012/0328202 A1* | 12/2012 | Tian et al. | | 382/209 |
| 2013/0173338 A1* | 7/2013 | Briancon et al. | | 705/7.29 |
| 2013/0212200 A1* | 8/2013 | Dennis et al. | | 709/206 |
| 2013/0311282 A1* | 11/2013 | Cochrane et al. | | 705/14.53 |
| 2013/0346331 A1* | 12/2013 | Giovannetti et al. | | 705/320 |
| 2013/0347128 A1* | 12/2013 | Cumming | | 726/28 |
| 2014/0068437 A1* | 3/2014 | Dedapper et al. | | 715/719 |
| 2014/0101729 A1* | 4/2014 | Novack et al. | | 726/4 |

OTHER PUBLICATIONS

Patent Cooperation Treaty, "International Search Report", issued in connection with PCT application No. PCT/CA2012/050414, mailed Mar. 21, 2013, 4 pages.

* cited by examiner

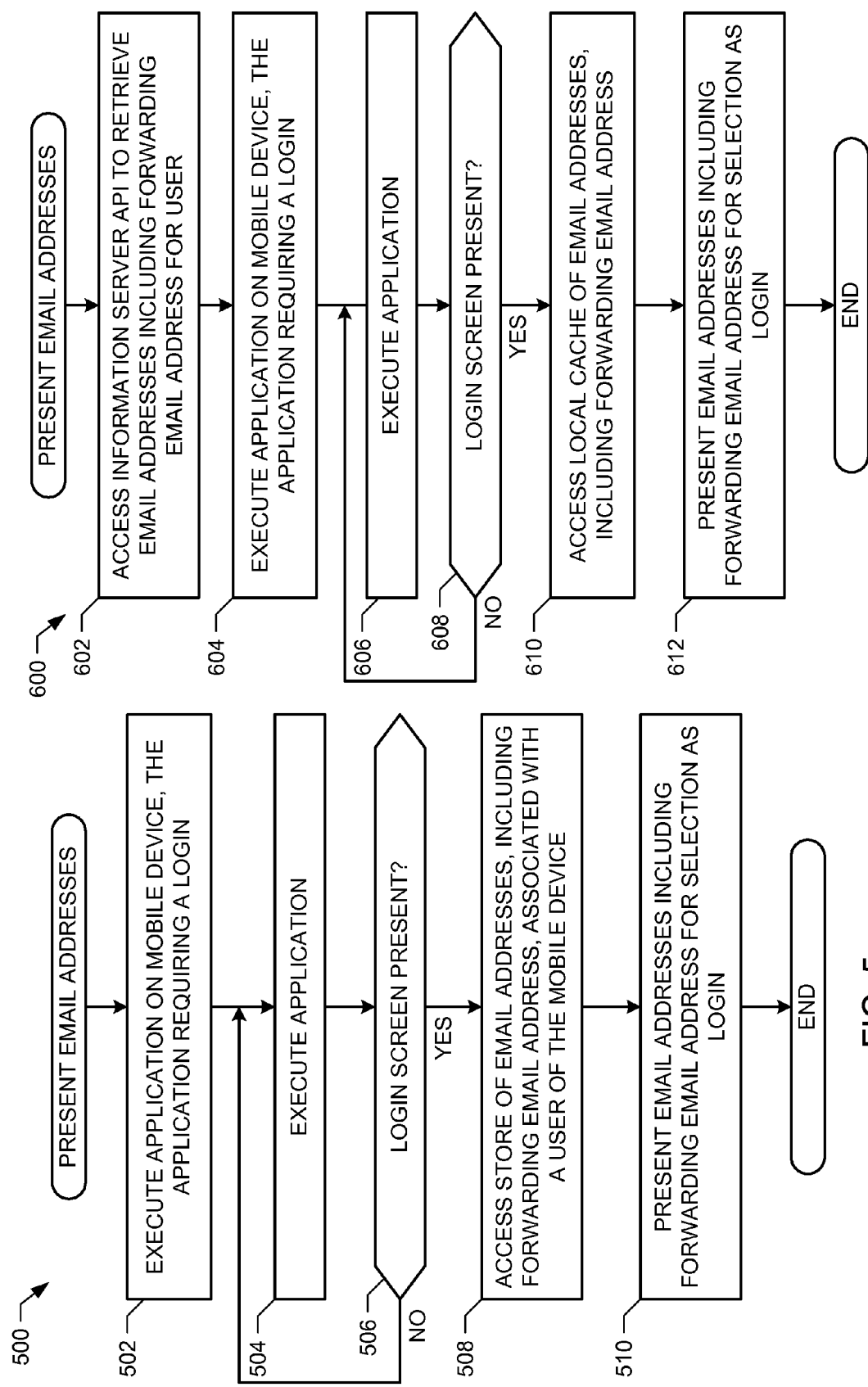

METHODS AND DEVICES FOR PRESENTING EMAIL ADDRESSES

FIELD OF THE DISCLOSURE

This disclosure relates generally to mobile devices and, more particularly, to methods and devices for presenting email addresses for an application login.

BACKGROUND

In recent years, mobile devices have been provided with the ability to install and run software produced and/or distributed by parties other than the manufacturers of the respective mobile devices. Some such applications require a user to log in to access data via the application.

BRIEF DESCRIPTION OF THE DRAWINGS

FIG. 5 is a flowchart representative of an example method to present email addresses including a forwarding email address.

FIG. 6 is a flowchart representative of another example method to present email addresses including a forwarding email address.

DETAILED DESCRIPTION

Figure 1:
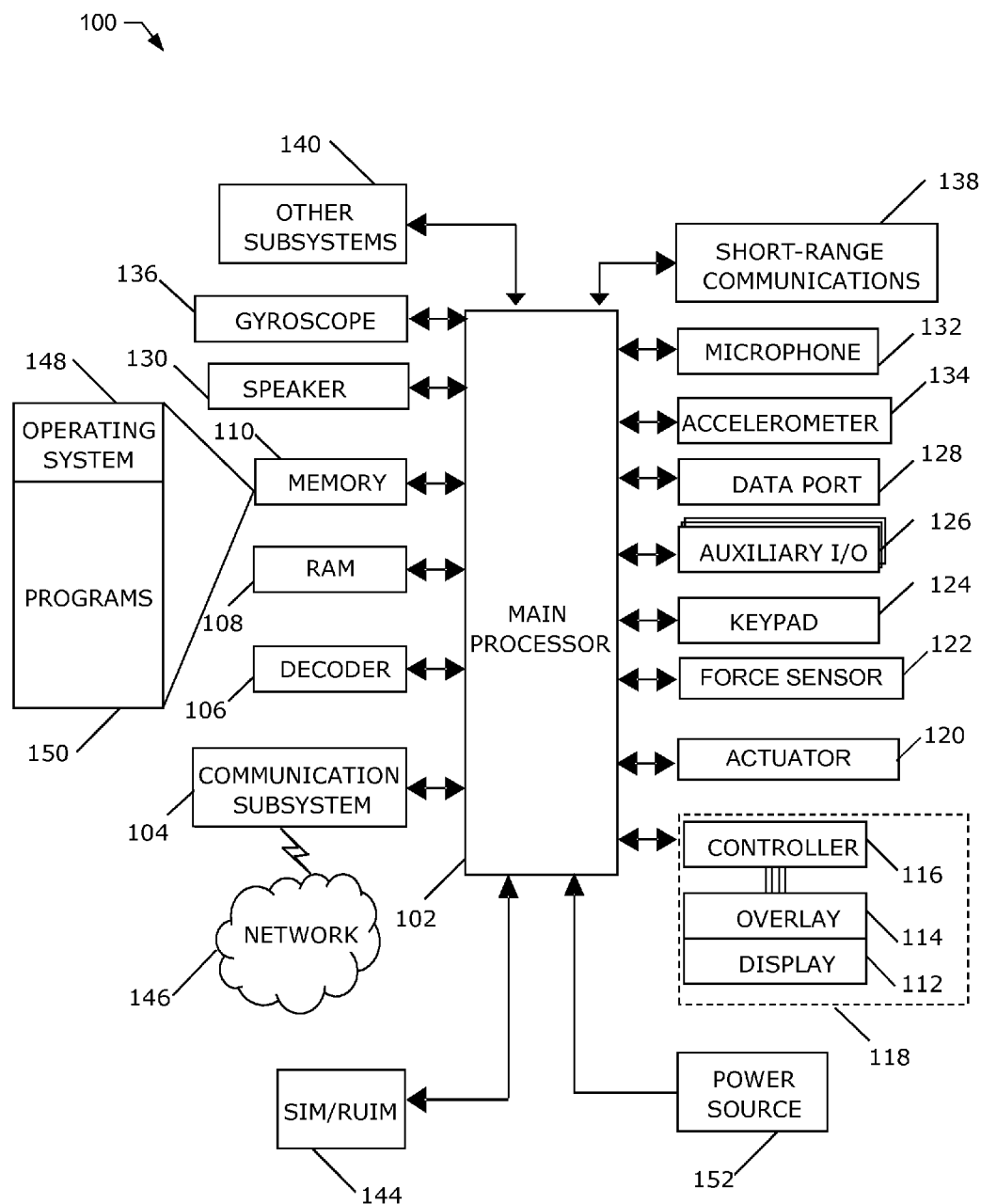
FIG. 1 is a block diagram of an example mobile device in accordance with the disclosure.

Example methods and devices for presenting email addresses, including a forwarding email address, such as for example reply-to email address, are disclosed herein.

A forwarding email address can be defined as an email address that is designated to receive emails that are delivered to another email address. Typically, the forwarding email address automatically receives the emails that are delivered to the other email address. In some examples, the emails that are forwarded to the forwarding email address are emails satisfying a particular condition or set of conditions (e.g., designated by a user in his email account settings for the other email address). For example, in a user's email account settings for a joesmith1@yahoo.com email account, a user specifies that all emails delivered to joesmith1@yahoo.com, are automatically forwarded to joesmith2@yahoo.com.

A reply-to email address is a type of a forwarding email address. A reply-to email address is defined as an email address that is designated to receive responses (e.g., emails) to emails that are sent from another email address. For example, in a user's email account settings for a joesmith1@yahoo.com email account, the user may specify that joesmith2@yahoo.com is the reply-to email address. When the user sends an email using his joesmith1@yahoo.com email account, any replies the user receives in response to the email are addressed to the joesmith2@yahoo.com email account.

In some examples, a user of a mobile device has multiple email addresses, at least one of which is a forwarding email address. The email addresses are provided to an information server that stores information for the user. Additionally, the mobile device may execute software applications that require the user to log in, or authenticate, prior to accessing some or all of the data available via the application. Example methods and device disclosed herein present the email addresses, including the forwarding email address, for easy entry by the user. Thus, example methods and devices disclosed herein provide an improved user experience by enabling rapid entry of a forwarding email address that the user may use to log in to one or more applications.

Disclosed example devices include a processor and a memory. The memory stores instructions which, when executed by the processor, cause the processor to: execute an application on a mobile device, the application requiring a login to access at least a portion of data accessible via the application; access a store of email addresses associated with a user of the mobile device, the email addresses including at least a forwarding email address; and present the email addresses including the forwarding email address for selection as the login.

In some examples, accessing the store includes accessing an application programming interface of an information server. In some examples, accessing the store includes accessing a local cache in the mobile device. In some such examples, the instructions further cause the processor to access an information server, download the email addresses including the forwarding email address, and store the email addresses including the forwarding email address in the local cache. In some example apparatus, the instructions further cause the processor to update the email addresses in the local cache based on at least one of an email address being added to the information server or one of the email addresses being removed from the information server.

In some examples, the forwarding email address is a reply-to email address. In some example apparatus, the application is a third-party application. In some examples, the instructions cause the processor to access the store of email addresses in response to executing the application. In some examples, the instructions cause the processor to access the store of email addresses in response to displaying a login screen via the application.

Disclosed example methods include executing an application on a mobile device, the application requiring a login to access at least a portion of data accessible via the application, accessing a store of email addresses associated with a user of the mobile device, the email addresses including at least a forwarding email address, and presenting the email addresses including the forwarding email address for selection as the login.

In some example methods, accessing the store includes accessing an application programming interface of an information server. In some examples, accessing the store includes accessing a local cache in the mobile device. Some such example methods further include accessing an information server, downloading the email addresses including the forwarding email address, and storing the email addresses including the forwarding email address in the local cache. In some such examples, the email addresses including the forwarding email address have been stored on the information server by the user. In some examples, the email addresses including the forwarding email address have been stored on the information server by the user.

In some example methods, the application is a third-party application. In some examples, the forwarding email address is a reply-to email address. In some example methods, accessing the store of email addresses is in response to executing the application. In some examples, accessing the store of email addresses is in response to displaying a login screen via the application.

A block diagram of an example mobile device 100 is shown in FIG. 1. The mobile device 100 includes multiple components, such as a processor 102 that controls the overall operation of the mobile device 100. Communication functions, including data and voice communications, are performed through a communication subsystem 104. The example communication subsystem 104 includes any number and/or type(s) of network interface circuit(s). Data received by the mobile device 100 is decompressed and decrypted by a decoder 106. The communication subsystem 104 receives messages from and sends messages to a wireless network 146. The wireless network 146 may be any type of wireless network, including, but not limited to, data wireless networks, voice wireless networks, and networks that support both voice and data communications. A power source 152, such as one or more rechargeable batteries or a port to an external power supply, powers the mobile device 100.

The processor 102 interacts with other components, such as Random Access Memory (RAM) 108, memory 110, a display 112 with a touch-sensitive overlay 114 operably connected to an electronic controller 116 that together include a touch-sensitive display 118, one or more actuator apparatus 120, one or more force sensors 122, a keypad 124, an auxiliary input/output (I/O) subsystem 126, a data port 128, a speaker 130, a microphone 132, an accelerometer 134, a gyroscope 136, short-range communications 138, and other device subsystems 140. User-interaction with a graphical user interface is performed through the touch-sensitive display 118. The processor 102 interacts with the touch-sensitive overlay 114 via the electronic controller 116. Information, such as text, characters, symbols, images, icons, and other items that may be displayed or rendered on a mobile device, is displayed on the touch-sensitive display 118 via the processor 102. In some examples, the display 112 may include a primary display and a secondary display. The display of information between the primary and the secondary displays are coordinated to provide information to a user when the electronic device is in an open position or a closed position.

To identify a subscriber for network access, the mobile device 100 uses a Subscriber Identity Module or a Removable User Identity Module (SIM/RUIM) card 144 for communication with a network, such as the wireless network 146. Alternatively, user identification information may be programmed into memory 110.

The mobile device 100 includes an operating system 148 and/or firmware and software programs or components 150 that are executed by the processor 102 to implement various applications and are typically stored in a persistent, updatable store such as the memory 110. Additional applications or programs may be loaded onto the mobile device 100 through the wireless network 146, the auxiliary I/O subsystem 126, the data port 128, the short-range communications subsystem 138, or any other suitable subsystem 140.

A received signal such as a text message, an e-mail message, or web page download is processed by the communication subsystem 104 and input to the processor 102. The processor 102 processes the received signal for output to the display 112 and/or to the auxiliary I/O subsystem 126. A subscriber may generate data items, for example data entry forms (e.g., notes), which may be transmitted over the wireless network 146 through the communication subsystem 104. For voice communications, the overall operation of the mobile device 100 is similar. The speaker 130 outputs audible information converted from electrical signals, and the microphone 132 converts audible information into electrical signals for processing.

Figure 2:
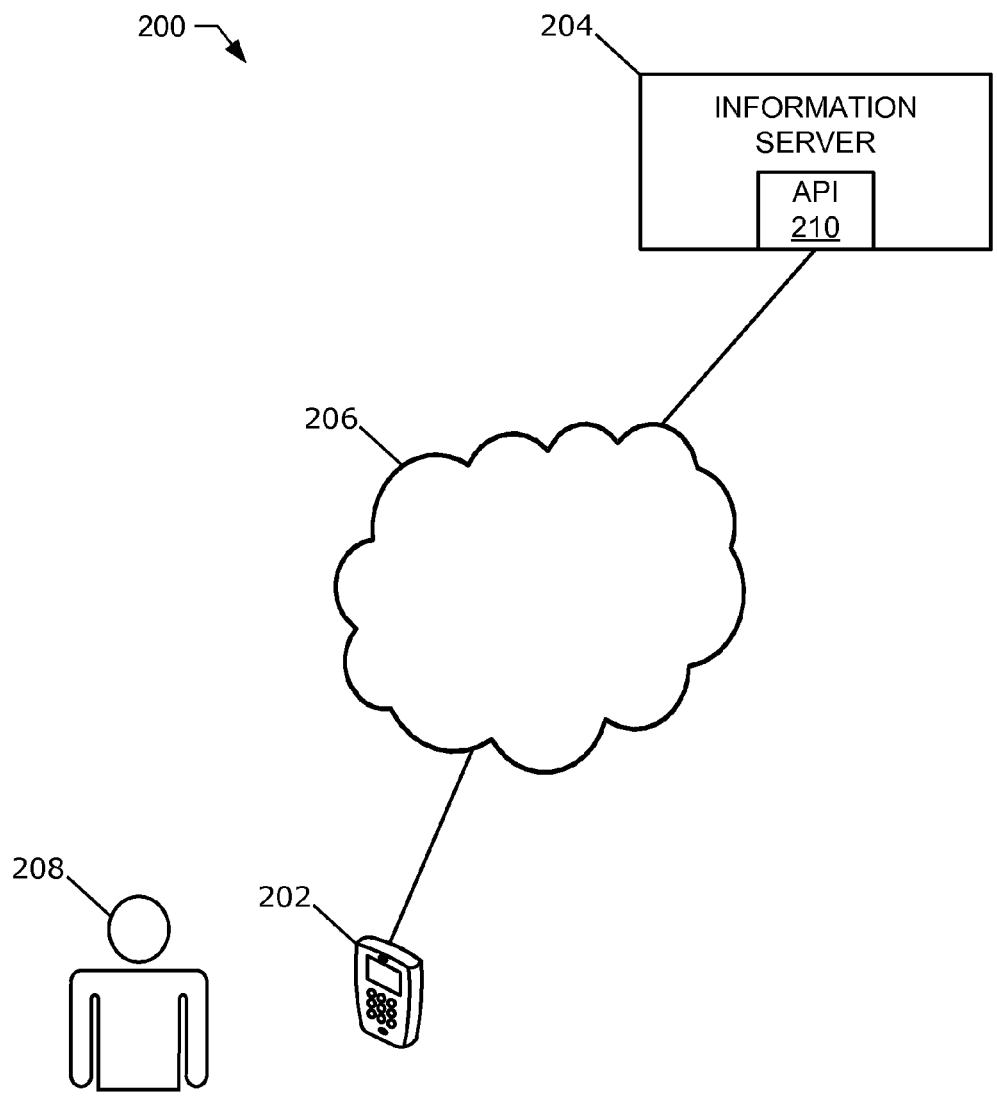
FIG. 2 illustrates an example system to present email addresses including a forwarding email address.

FIG. 2 illustrates an example system 200 to present email addresses including a forwarding email address. The example system 200 of FIG. 2 includes a mobile device 202 and an information server 204. The example mobile device 202 may be implemented by the mobile device 100 of FIG. 1. In some examples, the mobile device 202 is a smartphone or a tablet computer. The information server 204 of FIG. 2 is a Blackberry Internet Service (BIS) information server. In some other examples, the information server 204 is a Blackberry Enterprise Server (BES) information server. The information server 204 may be any other type of server. In some other examples, the information server 204 is an email server or any other server configured to store email addresses.

The example mobile device 202 and the information server 204 are connected via a network 206. The network 206 of FIG. 2 may be any communications network(s) and/or sub-network(s), including internets and/or intranets, such as the network 146 of FIG. 1. The mobile device 202 is assigned to, belongs to, and/or is otherwise associated with a user 208. The user 208 has (e.g., owns, is assigned, etc.) multiple email addresses. In the example system of FIG. 2, the user 208 has at least one forwarding email address.

The example mobile device 202 includes an email application that the user may use to send emails, with or without utilizing a forwarding email address. The mobile device 202 is also capable of installing third-party applications. Third-party applications refer to applications that are developed, sold, and/or distributed by a party other than the manufacturer of the mobile device 202 or software on the mobile device 202. Some such third-party applications require a login to access portions or all of the data accessible via the third-party application.

In the example of FIG. 2, the user 208 provides the information server 204 with multiple email addresses when the user 208 initially sets up (e.g., personalizes) the mobile device 202 and/or subsequent to initially setting up the mobile device 202. For example, the user 208 may provide one or more email addresses when initially setting up the mobile device 202 and provide one or more email addresses at a later time. In some other examples, the user 208 establishes and/or modifies a user profile at the information server 204 independently of the mobile device 202. The user 208 may delete any of the email addresses from the information server 204. The information server 204 stores the email addresses provided by the user at one or more times. The email addresses, including a forwarding email address, are then provided to the mobile device 202 for use in sending and/or receiving emails and/or for presenting the emails for logging into other applications.

The user profile is imported and/or synchronized to the mobile device 202. To enable access to the email addresses, the example information server 204 of FIG. 2 exposes an application programming interface (API) 210. The mobile device 202 requests the email addresses by accessing one or more functions in the API 210, which causes the information server 204 to retrieve and transmit the email addresses via another function of the API 210.

When the user logs into a third-party application requiring a login, the mobile device 202 presents the email addresses to the user for use in logging in to the third-party application. For example, the mobile device 202 may provide a menu and/or an auto-fill option for the email address. To present the email addresses, the example mobile device 202 accesses a store of email addresses (including at least one forwarding email address). In some examples, to access the store of email addresses the mobile device 202 accesses the information server 204 when the third-party application requests a login which may be an email address.

In some other examples, the mobile device 202 accesses the information server 204 periodically, aperiodically, in response to an event, and/or at particular times to retrieve and/or update the email addresses. The mobile device 202 then stores the email addresses in a local cache or storage on the mobile device 202. When the third party application requests a login which may be an email address, the example mobile device 202 then accesses the local storage or cache to present the email addresses including a forwarding email address.

Figure 3:
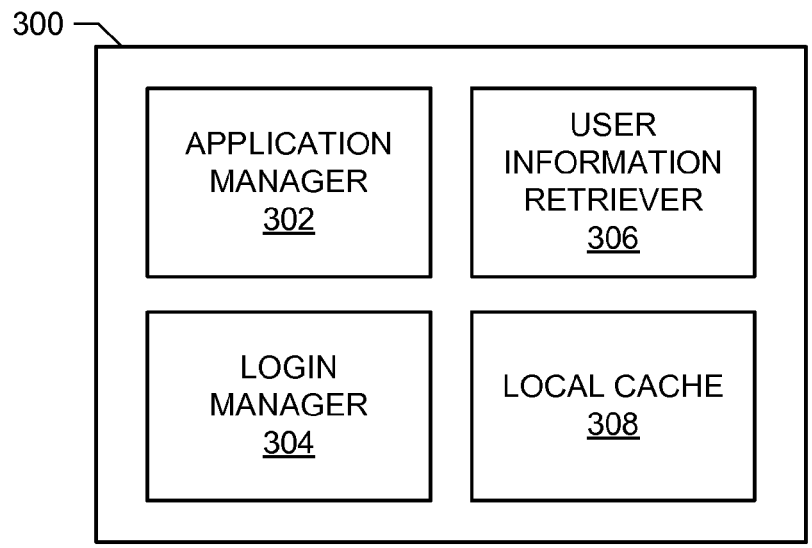
FIG. 3 illustrates a block diagram of an example mobile device to present email addresses including a forwarding email address.

FIG. 3 illustrates a block diagram of an example mobile device 300 to present email addresses including a forwarding email address. The example mobile device 300 of FIG. 3 may implement the mobile device 202 of FIG. 2 or the mobile device 100 of FIG. 1. The example mobile device 300 includes an application manager 302, a login manager 304, and a user information retriever 306.

The example application manager 302 of FIG. 3 initiates, executes, closes, and otherwise manages applications. Some of the applications are third-party applications and/or require a user to log in (e.g., enter a user name and/or password, authenticate, etc.) to access portions and/or all of the data accessible via the respective applications. In some examples, the login includes at least an email address.

The example login manager 304 of FIG. 3 stores email addresses associated with a user of the mobile device. In the example of FIG. 3, the email addresses include at least a forwarding email address if the user of the mobile device (e.g., the user 208 of the mobile device 202) has provided the forwarding email address to an information server (e.g., the information server 204). The example login manager 304 presents the email addresses, including the forwarding email address, for selection for the login when an application managed by the application manager 302 displays a login screen. In some examples, the login manager 304 presents the email addresses, including the forwarding email address, as a drop-down menu of email addresses at the login screen. The example login manager 304 populates an email address field of the login screen when the user selects one of the email addresses.

In some other examples, the login manager 304 presents the login screen including a login field. When the user begins typing an email address at the login field, the example login manager 304 automatically fills in the remainder of the email address based on which of the typed email addresses is consistent with the typed information.

The example user information retriever 306 retrieves the email addresses, including the forwarding email address, from an information server (e.g., the information server 204 of FIG. 2 via the API 210) and provides the email addresses, including the forwarding email address, to the login manager 304. In some examples, the login manager 304 requests the user information retriever 306 to retrieve the email addresses when the user is to log in to the application. For example, the login manager 304 may request the user information retriever 306 for email addresses associated with the user in response to the application manager 302 executing the application. In some other examples, the user information retriever 306 retrieves the email addresses independently of the user logging into the application (e.g., periodically, aperiodically, in response to an event, at particular times, etc.) and stores the retrieved email addresses and/or updates of the retrieved email addresses in a local cache 308. For example, updates to the email addresses in the local cache 308 may occur when an email address is added to the information server 204 or one or more email addresses have been removed from the information server 204 (e.g., by the user 208). The example login manager 304 then accesses the local cache 308 when an application requires a login to retrieve and present the email addresses including the forwarding email address.

Figure 4:
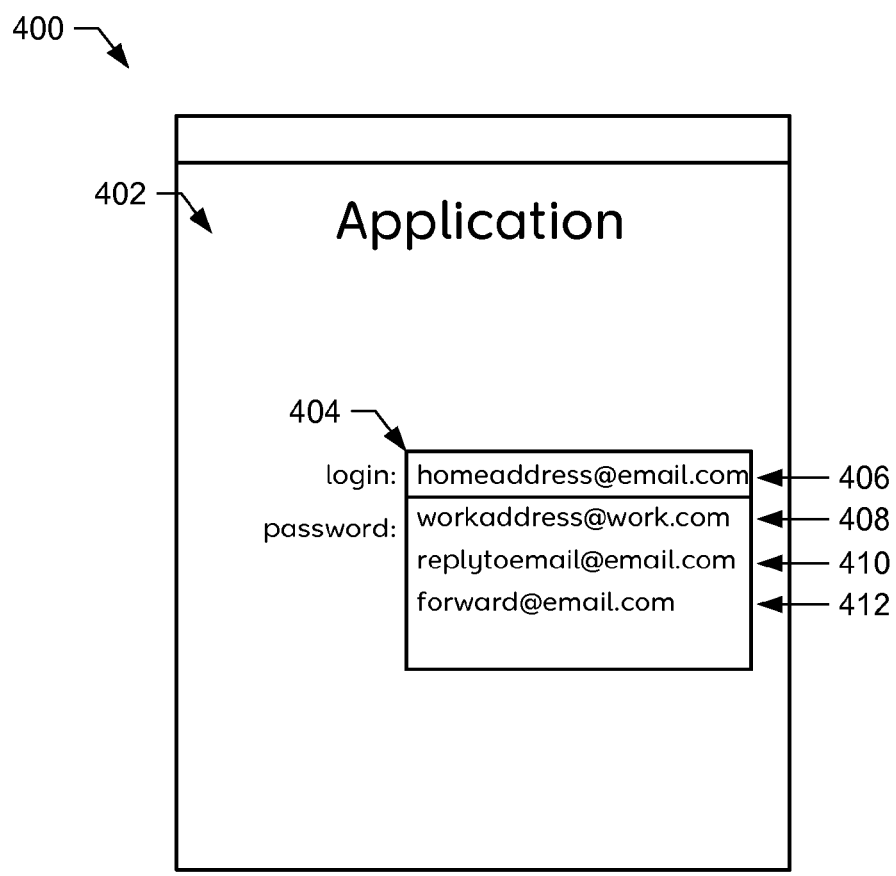
FIG. 4 illustrates a user interface of the example mobile device presenting email addresses including a forwarding email address.

FIG. 4 illustrates an example user interface 400 of the example mobile devices 100, 202, 300 of FIGS. 1, 2 and/or 3 presenting email addresses including a forwarding email address. The example user interface 400 includes a login screen 402 for an application (e.g., a third-party application executed and/or managed by the application manager 302 of FIG. 3). The example login screen 402 includes a login field 404 (in which a username or email address may be entered) and a password field.

The email address field 404 displays multiple example email address options or possible selections 406, 408, 410, 412 for the login. The email address options 406-412 include a reply-to email address 410 and a forwarding email address 412. The example login manager 304 of FIG. 3 populates the example email address field 404 with the options 406-412 to enable the user to rapidly select the email address to be used for logging in to the application. In some other examples, the login manager 304 attempts to pattern-match an email address being input into the email address field 404 by the user and automatically filling in the remainder of an email address that matches all or part of the user-entered information, such as a forwarding email address. The password field of the example login screen 402 is obscured by the list of email addresses presented by the login manager 304. When an email address is entered or selected, the password field may then be displayed (e.g., revealed) to enable a user to select the password field and enter a password.

While an example manner of implementing the mobile device 202 has been illustrated in FIGS. 1 and 3, one or more of the elements, processes and/or devices illustrated in FIGS. 1 and 3 may be combined, divided, re-arranged, omitted, eliminated and/or implemented in any other way. Further, the example application manager 302, the example login manager 304, the example user information retriever 306 and/or, more generally, the example device 300 of FIG. 3 may be implemented by hardware, software, firmware and/or any combination of hardware, software and/or firmware. Thus, for example, any of the example application manager 302, the example login manager 304, the example user information retriever 306 and/or, more generally, the example device 300 of FIG. 3 could be implemented by one or more circuit(s), logic circuit(s), programmable processor(s), application specific integrated circuit(s) (ASIC(s)), programmable logic device(s) (PLD(s)) and/or field programmable logic device(s) (FPLD(s)), etc. When any of the appended apparatus or system claims are read to cover a purely software and/or firmware implementation, at least one of the example application manager 302, the example login manager 304, and/or the example user information retriever 306 are hereby expressly defined to include a tangible computer readable medium such as a memory, DVD, CD, etc. storing the software and/or firmware. Further still, the example devices 100 and 300 may include one or more elements, processes and/or devices in addition to, or instead of, those illustrated in FIGS. 1 and 3, and/or may include more than one of any or all of the illustrated elements, processes and devices.

Flowcharts representative of example machine readable instructions for implementing the mobile devices 100, 202, 300 of FIGS. 1, 2, and/or 3 are shown in FIGS. 5 and 6. In these examples, the machine readable instructions include program(s) for execution by a processor such as the processor 102 shown in the example mobile device 100 discussed above in connection with FIG. 1. The program may be embodied in software stored on a tangible computer readable medium such as the RAM 108 and/or the memory 110 associated with the processor 102, but the entire program and/or parts thereof could alternatively be executed by a device other than the processor 102 and/or embodied in firmware or dedicated hardware. Further, although the example program(s) are described with reference to the flowcharts illustrated in FIGS. 5 and/or 6, many other methods of implementing mobile devices 100, 202, 300 may alternatively be used. For example, the order of execution of the blocks may be changed, and/or some of the blocks described may be changed, eliminated, or combined.

As mentioned above, the example processes of FIGS. 5 and/or 6 may be implemented using coded instructions (e.g., computer readable instructions) stored on a tangible computer readable medium such as a hard disk drive, a flash memory, a read-only memory (ROM), a cache, a RAM and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 5 and/or 6 may be implemented using coded instructions (e.g., computer readable instructions) stored on a non-transitory computer readable storage medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable storage medium is expressly defined to include any type of computer readable medium and to exclude propagating signals.

FIG. 5 is a flowchart representative of an example method 500 to present email addresses including a forwarding email address. The example method 500 may be performed by any or all of the example mobile devices 100, 202, 300 of FIGS. 1-3. The method 500 of FIG. 5 executes an application on the mobile device (block 502). The application may be executed by, for example, an application manager (e.g., the application manager 302 of FIG. 3). In the example method 500, the application requires a login that may be an email address.

The example application manager 302 executes the application (e.g., handles user inputs, outputs, data processing, data access, etc.) for the application (block 504). The example login manager 304 determines whether a login screen is present (block 506). If a login screen is not present (block 506), control returns to block 504 to continue executing the application. If a login screen is present (block 506), the example login manager accesses a store of email addresses that are associated with a user of the mobile device 300, the email addresses including at least a forwarding email address (block 508). For example, the email addresses (including the forwarding email address) may have been previously stored on an information server (e.g., the information server 204 of FIG. 2) by the user. The login manager 304 causes a user information retriever (e.g., the user information retriever 306) to retrieve the email addresses (e.g., by accessing an API of the information server 204) and provide the email addresses to the login manager 304.

The example login manager 304 presents the email addresses, including the forwarding email address, for selection as a login (block 510). For example, the login manager 304 may present a list of email addresses and/or perform pattern-matching of the email addresses based on a user inputting a partial email address. A user may select one of the email addresses if presented in a list and/or may confirm a pattern-matched email address, which is then populated in an email address field (e.g., the field 402 of FIG. 4). The example method 500 may then end and/or iterate for additional login (s) and/or additional application(s).

FIG. 6 is a flowchart representative of another example method 600 to present email addresses including a forwarding email address. The example method 600 may be performed by any or all of the example mobile devices 100, 202, 300 of FIGS. 1-3. The method 600 accesses an information server API (e.g., the API 210 of the information server 204 of FIG. 2) to retrieve email addresses including a forwarding email address associated with a user of a mobile device (e.g., the mobile devices 100, 202, 300 of FIGS. 1-3) (block 602).

The example application manager 302 executes an application on the mobile device (block 604). In the example method 600, the application requires a login that may be an email address. The example application manager 302 executes the application (e.g., handles user inputs, outputs, data processing, data access, etc.) for the application (block 606). The example login manager 304 determines whether a login screen is present (block 608). If a login screen is not present (block 608), control returns to block 606 to continue executing the application.

If a login screen is present (block 608), the example login manager 304 accesses a store of email addresses in a local cache of the mobile device 100, 202, 300 (block 610). In the example method 600, the email addresses in the local cache have been populated and/or updated by the user information retriever 306 prior to the login screen being displayed. The email addresses may include a forwarding email address. The example login manager 304 presents the email addresses, including any forwarding email addresses, for selection as a login email address on the login screen (block 612). A user may select one of the email addresses if presented in a list and/or may confirm a pattern-matched email address, which is then populated in an email address field (e.g., the field 402 of FIG. 4). The example method 600 may then end and/or iterate for additional login(s) and/or additional application(s).

Although certain methods, apparatus, and articles of manufacture have been described herein, the scope of coverage of this patent is not limited thereto. To the contrary, this patent covers all methods, apparatus, and articles of manufacture falling within the scope of the claims.

What is claimed is:

1. A method, comprising:
executing an application on a mobile device, the application requiring a login to access at least a portion of data accessible via the application;
accessing an information server;
downloading email addresses associated with a user of the mobile device including a forwarding email address;
storing the email addresses including the forwarding email address in a local cache in the mobile device;
updating the email addresses in the local cache based on at least one of an email address being added to the information server or one of the email addresses being removed from the information server;
accessing the email addresses in the local cache in the mobile device, the email addresses including the forwarding email address; and presenting the email addresses including the forwarding email address, the forwarding email address being presented for selection as the login.

2. A method as defined in claim 1, wherein accessing the information server comprises accessing an application programming interface of an information server.

3. A method as defined in claim 1, wherein the email addresses including the forwarding email address have been stored on the information server by the user.

4. A method as defined in claim 1, wherein the forwarding email address is a reply-to email address.

5. A method as defined in claim 1, wherein accessing the email addresses is in response to executing the application.

6. A method as defined in claim 1, wherein accessing the email addresses is in response to displaying a login screen via the application.

7. A method as defined in claim 1, wherein the application is a third-party application.

8. A mobile device, comprising:
a processor; and
a memory, storing instructions which, when executed by the processor, cause the processor to at least:
   execute an application on a mobile device, the application requiring a login to access at least a portion of data accessible via the application;
   access an information server;
   download email addresses associated with a user of the mobile device including a forwarding email address;
   store the email addresses including the forwarding email address in a local cache in the mobile device;
   update the email addresses in the local cache based on at least one of an email address being added to the information server or one of the email addresses being removed from the information server;
   access the email addresses in the local cache in the mobile device, the email addresses including the forwarding email address; and
   present the email addresses including the forwarding email address, the forwarding email address being presented for selection as the login.

9. A mobile device as defined in claim 8, wherein accessing the information server comprises accessing an application programming interface of an information server.

10. A mobile device as defined in claim 8, wherein the forwarding email address is a reply-to email address.

11. A mobile device as defined in claim 8, wherein the application is a third-party application.

12. A mobile device as defined in claim 8, wherein the instructions further cause the processor to access the email addresses in response to executing the application.

13. A mobile device as defined in claim 8, wherein the instructions further cause the processor to access the email addresses in response to displaying a login screen via the application.

14. A tangible computer readable medium, excluding propagating signals, comprising instructions which, when executed by a processor, cause the processor to at least:
   execute an application on a mobile device, the application requiring a login to access at least a portion of data accessible via the application;
   access an information server;
   download email addresses associated with a user of the mobile device including a forwarding email address;
   store the email addresses including the forwarding email address in a local cache in the mobile device;
   update the email addresses in the local cache based on at least one of an email address being added to the information server or one of the email addresses being removed from the information server;
   access the email addresses in the local cache in the mobile device, the email addresses including the forwarding email address; and
   present the email addresses including the forwarding email address, the forwarding email address being presented for selection as the login.

15. A tangible computer readable medium, excluding propagating signals, as defined in claim 14, wherein accessing the information server comprises accessing an application programming interface of an information server.

16. A tangible computer readable medium, excluding propagating signals, as defined in claim 14, wherein the forwarding email address is a reply-to email address.

17. A tangible computer readable medium, excluding propagating signals, as defined in claim 14, wherein the application is a third-party application.

18. A tangible computer readable medium, excluding propagating signals, as defined in claim 14, wherein the instructions further cause the processor to access the email addresses in response to executing the application.

19. A tangible computer readable medium, excluding propagating signals, as defined in claim 14, wherein the instructions further cause the processor to access the email addresses in response to displaying a login screen via the application.

* * * * *